US009051488B2

(12) United States Patent
Luo et al.

(10) Patent No.: US 9,051,488 B2
(45) Date of Patent: Jun. 9, 2015

(54) MULTIFUNCTIONAL PRIMERS

(75) Inventors: Caidian Luo, Alta Loma, CA (US); Van Ngoc Nguyen, Lake Forest, CA (US); Ryan Matthew Sullivan, Anaheim, CA (US)

(73) Assignee: James Hardie Technology Limited, Dublin (IE)

( * ) Notice: Subject to any disclaimer, the term of this patent is extended or adjusted under 35 U.S.C. 154(b) by 276 days.

(21) Appl. No.: 12/163,541

(22) Filed: Jun. 27, 2008

(65) Prior Publication Data
US 2009/0005494 A1 Jan. 1, 2009

Related U.S. Application Data

(60) Provisional application No. 60/947,252, filed on Jun. 29, 2007.

(51) Int. Cl.
| | |
|---|---|
| *C09D 133/08* | (2006.01) |
| *C09D 175/04* | (2006.01) |
| *C08L 75/04* | (2006.01) |
| *C08L 83/00* | (2006.01) |
| *C04B 41/00* | (2006.01) |
| *C04B 41/48* | (2006.01) |
| *C04B 41/52* | (2006.01) |
| *C04B 41/63* | (2006.01) |
| *C04B 41/71* | (2006.01) |
| *C08F 28/00* | (2006.01) |
| *C09D 183/02* | (2006.01) |
| *C04B 111/00* | (2006.01) |

(52) U.S. Cl.
CPC ............ *C09D 133/08* (2013.01); *C04B 41/009* (2013.01); *C04B 41/483* (2013.01); *C04B 41/52* (2013.01); *C04B 41/63* (2013.01); *C04B 41/71* (2013.01); *C04B 2111/00491* (2013.01); *C08F 28/00* (2013.01); *C08L 75/04* (2013.01); *C08L 83/00* (2013.01); *C08L 2205/03* (2013.01); *C09D 175/04* (2013.01); *C09D 183/02* (2013.01)

(58) Field of Classification Search
CPC ..... C09D 133/08; C09D 175/04; C08L 75/04
USPC .......................... 524/502, 556, 497, 492, 493
See application file for complete search history.

(56) References Cited

U.S. PATENT DOCUMENTS

| | | | |
|---|---|---|---|
| 3,931,448 | A | 1/1976 | Parkinson |
| 4,143,188 | A | 3/1979 | Huber-Nuesch et al. |
| 4,226,277 | A | 10/1980 | Matalon |
| 4,246,148 | A | 1/1981 | Shimp et al. |
| 4,759,961 | A | 7/1988 | Kato et al. |
| 5,059,264 | A | 10/1991 | Sheets |
| 5,087,405 | A | 2/1992 | Maker |
| 5,162,407 | A | 11/1992 | Turner |
| 5,445,754 | A | 8/1995 | Nelson |
| 5,681,877 | A | 10/1997 | Hosotte-Filbert et al. |
| 5,688,642 | A | 11/1997 | Chrisey et al. |
| 6,068,885 | A | 5/2000 | Hartman et al. |
| 6,069,217 | A | 5/2000 | Nae et al. |
| 6,376,570 | B1 * | 4/2002 | Zhao et al. ............. 522/42 |
| 6,376,579 | B1 | 4/2002 | Mishra et al. |
| 6,395,804 | B1 | 5/2002 | Rao et al. |
| 6,420,479 | B1 | 7/2002 | Phan et al. |
| 6,572,927 | B1 | 6/2003 | Pleyers et al. |
| 6,680,111 | B1 | 1/2004 | Leibler et al. |
| 6,710,112 | B1 | 3/2004 | Sandor et al. |
| 6,933,415 | B2 | 8/2005 | Zhao et al. |
| 7,041,727 | B2 | 5/2006 | Kubicek et al. |
| 7,235,595 | B2 | 6/2007 | Hermes et al. |

(Continued)

FOREIGN PATENT DOCUMENTS

| | | |
|---|---|---|
| AU | 515151 | 3/1981 |
| DE | 1958706 | 3/1971 |
| EP | 0469295 | 2/1992 |
| JP | 10279831 | 10/1998 |
| JP | 2000327453 | 11/2000 |
| WO | WO-9845222 | 10/1998 |
| WO | WO-0168547 | 9/2001 |
| WO | WO-0228795 | 4/2002 |
| WO | WO-0228796 | 4/2002 |
| WO | WO 2004/087412 | 10/2004 |
| WO | WO 2005083014 A1 * | 9/2005 |
| WO | WO-2007022449 | 2/2007 |
| WO | WO-2009006304 | 1/2009 |
| WO | WO-2009006324 | 1/2009 |
| WO | WO 2009006324 A1 * | 1/2009 .............. C08F 28/00 |
| WO | WO-2009006333 | 1/2009 |

OTHER PUBLICATIONS

Omyacarb 5 -FL Product Data Sheet (Nov. 20, 2006) Online at: www.omya-na.com/B2BShrtPr.nsf/(alldocs)/
5A3467E5925784DB85256FA900509F1C/$FILE/
OMYACARB%205%20-%20FL.pdf.*

(Continued)

*Primary Examiner* — Ling Choi
*Assistant Examiner* — Ronald Grinsted
(74) *Attorney, Agent, or Firm* — Knobbe, Martens, Olson & Bear, LLP

(57) ABSTRACT

Multifunctional primer formulations are disclosed for composite building materials, such as materials that are generally cementitious, gypsum, or of another inorganic building material, including those containing cellulose, glass, steel or polymeric fibers. The multifunctional primer formulations provide multifunctional action to the primer including an ability to function as a primer and sealer in only a single coating. Such formulations when applied to a suitable substrate provide excellent adhesion to the substrate and improve paint adhesion and performance when applied thereto. Superior properties over commercial products is particularly notable when the formulations herein are applied to substrates, such as fiber cement, that have been manipulated or sized by cutting (e.g., by saw or water jet), sanding, punching, and/or shearing.

13 Claims, 4 Drawing Sheets

(56) References Cited

U.S. PATENT DOCUMENTS

| | | | |
|---|---|---|---|
| 2001/0051227 A1 | 12/2001 | Jung et al. | |
| 2001/0053449 A1 | 12/2001 | Parekh et al. | |
| 2002/0058110 A1 | 5/2002 | Even | |
| 2002/0061940 A1 | 5/2002 | Lach et al. | |
| 2002/0072562 A1 | 6/2002 | Asthana | |
| 2002/0077397 A1 | 6/2002 | Karuga et al. | |
| 2002/0081437 A1 | 6/2002 | Dargontina et al. | |
| 2002/0136900 A1 | 9/2002 | Mallen | |
| 2002/0150689 A1 | 10/2002 | Seibel et al. | |
| 2002/0156163 A1 | 10/2002 | Brandenburger et al. | |
| 2002/0169271 A1 | 11/2002 | Peng et al. | |
| 2002/0171170 A1* | 11/2002 | DeMasi et al. | 264/255 |
| 2002/0193548 A1 | 12/2002 | Throne et al. | |
| 2003/0054176 A1 | 3/2003 | Pantano et al. | |
| 2003/0088014 A1 | 5/2003 | Edwards et al. | |
| 2003/0158351 A1 | 8/2003 | Smith et al. | |
| 2003/0207035 A1 | 11/2003 | Schmid et al. | |
| 2003/0236340 A1 | 12/2003 | Kubicek et al. | |
| 2004/0005455 A1 | 1/2004 | Stephenson et al. | |
| 2004/0081706 A1 | 4/2004 | Trainer et al. | |
| 2005/0043446 A1 | 2/2005 | Bochan et al. | |
| 2005/0058689 A1 | 3/2005 | McDaniel | |
| 2005/0192400 A1 | 9/2005 | Killilea et al. | |
| 2005/0196629 A1 | 9/2005 | Bariatinsky et al. | |
| 2005/0214550 A1 | 9/2005 | Kawamura | |
| 2005/0215708 A1 | 9/2005 | Robertson | |
| 2005/0227100 A1 | 10/2005 | Brandenburger et al. | |
| 2005/0238898 A1 | 10/2005 | Wind et al. | |
| 2006/0003159 A1 | 1/2006 | Hayes et al. | |
| 2006/0029825 A1 | 2/2006 | Chen et al. | |
| 2006/0036056 A1 | 2/2006 | Wu et al. | |
| 2006/0063871 A1 | 3/2006 | Taylor et al. | |
| 2006/0105161 A1 | 5/2006 | Brandenburger et al. | |
| 2006/0111503 A1 | 5/2006 | Killilea et al. | |
| 2006/0122330 A1 | 6/2006 | Wu et al. | |
| 2006/0135684 A1 | 6/2006 | Killilea | |
| 2006/0135686 A1 | 6/2006 | Killilea et al. | |
| 2006/0141261 A1 | 6/2006 | Wind et al. | |
| 2006/0167208 A1 | 7/2006 | Garner et al. | |
| 2006/0182946 A1 | 8/2006 | Zarb et al. | |
| 2006/0202161 A1 | 9/2006 | Share et al. | |
| 2006/0207476 A1 | 9/2006 | Coward et al. | |
| 2006/0210153 A1 | 9/2006 | Sara et al. | |
| 2007/0001343 A1 | 1/2007 | Pulman et al. | |
| 2007/0010612 A1 | 1/2007 | Rouge et al. | |
| 2007/0027249 A1 | 2/2007 | Killilea | |
| 2007/0036903 A1 | 2/2007 | Mayr et al. | |
| 2007/0042192 A1 | 2/2007 | Nguyen et al. | |
| 2007/0045891 A1 | 3/2007 | Martinoni et al. | |
| 2007/0054140 A1 | 3/2007 | Mayr et al. | |
| 2007/0065608 A1 | 3/2007 | Niederst | |
| 2007/0087146 A1 | 4/2007 | Evans et al. | |
| 2007/0110933 A1 | 5/2007 | Share et al. | |
| 2007/0110981 A1 | 5/2007 | Killilea et al. | |
| 2007/0117928 A1 | 5/2007 | O'Brien et al. | |
| 2007/0132158 A1 | 6/2007 | Martinoni et al. | |
| 2007/0154643 A1 | 7/2007 | Schmid et al. | |
| 2007/0169843 A1 | 7/2007 | Henderleiter | |
| 2007/0178239 A1 | 8/2007 | Kestell et al. | |
| 2007/0178294 A1 | 8/2007 | Dargontina et al. | |
| 2007/0259166 A1 | 11/2007 | Killilea et al. | |
| 2007/0259188 A1 | 11/2007 | Wu et al. | |
| 2007/0269660 A1 | 11/2007 | Killilea et al. | |
| 2007/0269668 A1 | 11/2007 | Hayes et al. | |
| 2007/0275198 A1 | 11/2007 | Share et al. | |
| 2007/0282046 A1 | 12/2007 | Killilea et al. | |
| 2008/0008895 A1 | 1/2008 | Garner et al. | |
| 2008/0009601 A1 | 1/2008 | Killilea et al. | |
| 2008/0041003 A1 | 2/2008 | Nowak et al. | |
| 2008/0096024 A1 | 4/2008 | Cavallin | |
| 2009/0004468 A1 | 1/2009 | Chen et al. | |
| 2009/0005484 A1 | 1/2009 | Lazarus et al. | |

OTHER PUBLICATIONS

Schrickel, Jorg. (Feb. 1, 2000) Efficiency and compatability in one polysiloxane antifoam—even the side effects are . . . Allbusiness. com. Available Online at: www.allbusiness.com/manufacturing/chemical-manufacturing-paint/462854-1.html.*

Ahadi, M. Mandavian and M. Mohammadzadeh Attar. (Aug. 2007) OCP Measurement: A Method to Determine CPVC. Scientia Iranica, vol. 14 (4), pp. 369-372) Online At: http://www.scientiairanica.com/PDF/Articles/00000501/mohamad%20atar.pdf.*

Ticona 595 Product Literature. (Apr. 2008) Online at: http://www.millenniumchem.com/NR/rdonlyres/89E1BB2E-AC9A-448C-A9B5-E9230CA50C9C/0/Tiona595FINAL.pdf.*

International Preliminary Report on Patentability for corresponding PCT Application No. PCT/US2008/068626, dated Jan. 5, 2010, 5 pages.

Extended European Search Report for corresponding European Application No. EP 08781114.7, dated Oct. 10, 2012, 5 pages.

Union Carbide, "UCAR LATEX 626: All-Acrylic Binder for Architectural Coatings", 10 pages.

PQ Corporation "PQ Potassium Silicates: Liquids, Powders, and Flake Glass", Copyright 2004, 16 pages.

Lubrizol, "Carboset CR717: Acrylic Copolymer Emulsion". 9 pages.

Rhodia, "Rhodocoat Polyisocyanates for Waterborne Polyurethane Coatings. And Waterborne Becomes Easy!", 8 pages.

* cited by examiner

MULTIFUNCTIONAL PRIMERS

BACKGROUND

This invention relates generally to a multifunctional primer for composite building materials, such as fiber cement building materials. In addition, it relates to an improved primer that functions as both a sealer and a primer.

Production of a composite building materials often requires that the surface of the material be modified (e.g., smoother, rougher, textured). For example, building products may be reduced in size by cutting (e.g., by saw or water jet), sanding, punching, shearing. Such modifications may not only change the appearance of the surface, they may also leave the surface burnished and/or with particulates and dust. Unfortunately, such surfaces are very difficult to coat with coating materials (e.g., sealer, primer, paint, stain). This is particularly true for cementitious materials, such as fiber cement. Dusty, burnished and/or smooth fiber cement surfaces are especially problematic and adhesion of a coating to such surfaces is difficult to achieve. In fact, the surface characteristics are often so different after such modifications that there is no adhesion of a first coating material to the building material (e.g., sealer to substrate) and/or no adhesion between a second coating and the first coating (e.g., topcoat to sealer or topcoat to primer).

When a sealer and a primer are desired for a building material, the application of separate coatings can prove complicated and costly. A typical coating process requires multiple heating steps, devices of cleaning, coating, application, heating, drying, curing and packaging, all of which reduce efficiency of work and usage of manpower as well as equipment. There are often compatibility issues between the different coating layers and between the coating and the substrate that must be attended to. In addition, when more than one type of coating is required, durability and performance characteristics of each coating must be properly assessed.

SUMMARY

Described herein are multifunctional primers for a composite building material, such as a cementitious material, gypsum, or other inorganic composite materials, that overcome inadequacies described above. The multifunctional primer may be provided as a sealer and a primer and offers improved features for superior adhesion to composite building materials, such as saw cut or sanded surfaces.

A multifunctional primer described herein includes a self-sealing primer. The binder included in the primer may be an acrylic silicate binder, an acrylic urethane binder, an acrylic siloxane binder or any combination thereof. Accordingly, the multifunctional primer formulation for a composite building material as described herein includes an emulsion with an acrylic silicate binder or an acrylic urethane binder or an acrylic siloxane binder that imparts a multifunctional action to the substrate and the topcoat applied thereafter.

Such a formulation with an acrylic silicate binder may comprise a dispersant as a solution of a sodium salt of an acrylate copolymer, a surfactant as a nonionic surfactant, and/or a polysilicone defoamer. In one form, the acrylic is an acrylic latex. The acrylic-silicate binder ratio is typically between about 0.5 and about 1.5. The formulation further comprises a pigment, which may be in the form of titanium oxide or other suitable pigments. When the formulation comprises a filler, particles are typically less than 10 micron. The multifunctional action includes functioning as a primer and a sealer and the multifunctional action is maintained with addition of a topcoat.

With an acrylic urethane binder, a formulation may comprise a dispersant as a solution of a sodium salt of an acrylate copolymer, a surfactant as a solution of alkylammonium salt of a polyfunctional polymer with anionic or non-ionic character and/or a non-silicon defoamer. The acrylic may be a hydroxyl-functional acrylic co-polymer. The formulation may further comprise a polyisocyanate cross-linker, a pigment such as titanium oxide, a filler with particles less than 1 micron, and/or a solvent of ethylene glycol monobutyl ether. The multifunctional action includes functioning as a primer and a sealer and the multifunctional action is maintained with addition of a topcoat.

Those skilled in the art will further appreciate the above-noted features and advantages of the invention together with other important aspects thereof upon reading the detailed description that follows and in conjunction with the drawings.

BRIEF DESCRIPTION OF THE DRAWINGS

For more complete understanding of the features and advantages of the inventions described herein, reference is now made to a description of the invention along with accompanying figures, wherein.

DETAILED DESCRIPTION

Figure 1:
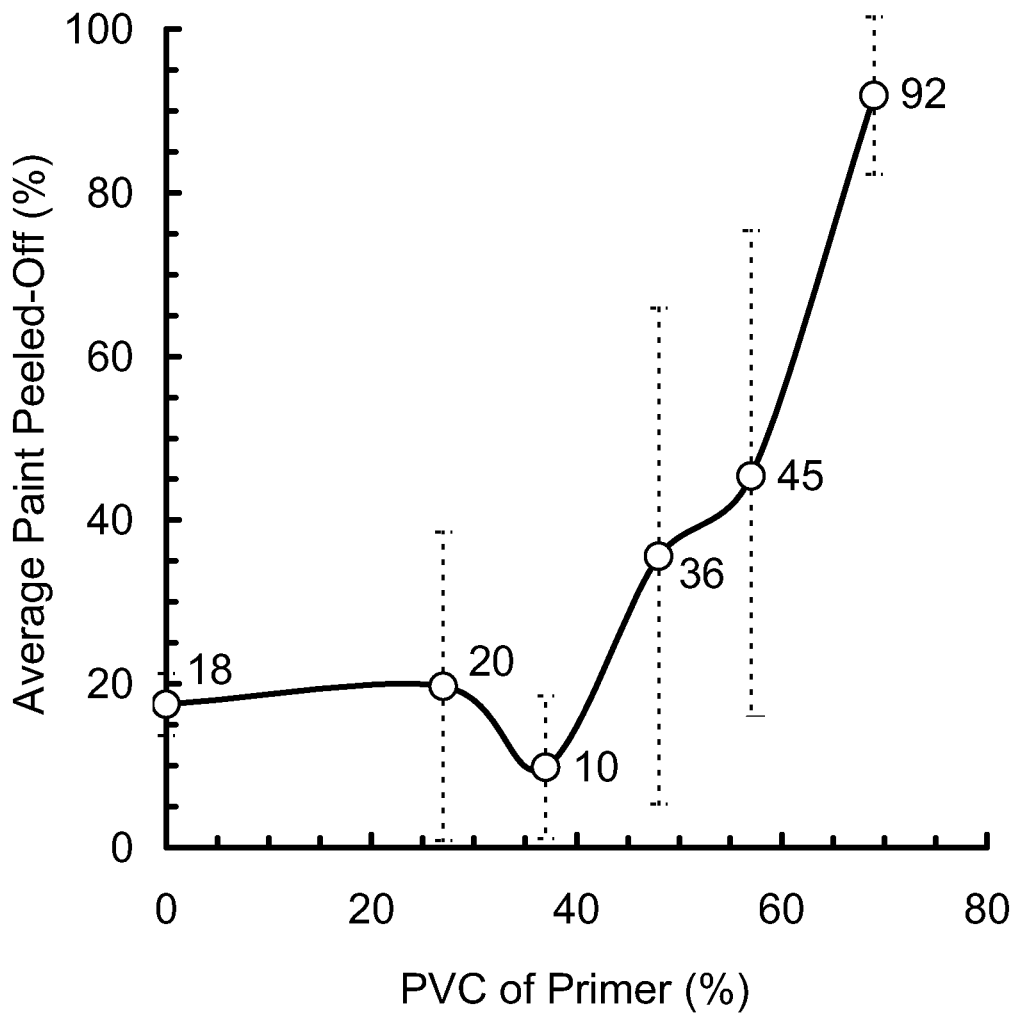
FIG. 1 illustrates wet adhesion as a function of pigment volume concentration in a multifunctional primer formulation described herein.

Although making and using various embodiments are discussed in detail below, it should be appreciated that the description provides many inventive concepts that may be embodied in a wide variety of contexts. The specific aspects and embodiments discussed herein are merely illustrative of ways to make and use the invention, and do not limit the scope of the invention.

Described herein, in one or more embodiments, are primer formulations. The primer has multifunctional capabilities and is self-sealing in which it acts as a sealer and a primer. The term "sealer" is used herein in its general meaning of a substance (coating) applied to a substrate, typically as a basecoat for paints, stains, varnish, as examples. The primer formulation is designed for use on building material substrates, preferably composite building materials, including fiber cement substrates having saw cut and sanded surfaces.

Formulations for a multifunctional primer as described herein are identified in TABLE 1. A typical formulation includes at least one carrier, solvent, surfactant, dispersant, thickener, defoamer, pigment, filler, and resin binder. In one or more embodiments, the resin binder is a silicate acrylic latex, silicate acrylic copolymer, silicate styrenated acrylic, urethane acrylic latex or any combination thereof. Multifunctional primer formulations may include a general range as presented in TABLE 1.

TABLE 1

Formulations of one or more embodiments

| Component | Acceptable range (% W/W) | A preferred range (% W/W) |
|---|---|---|
| carrier | 0-50 | 10-35 |
| surfactant | 0-2 | 0.1-0.6 |
| dispersant | 0-2 | 0.1-1.5 |
| resin binder | 10-80 | 30-60 |
| thickener | 0-1 | 0.1-0.3 |
| filler | 0-30 | 5-20 |
| defoamer | 0-1 | 0.1-0.4 |
| solvent | 0-5 | 0-3 |
| pigment | 5-30 | 10-20 |

The binder used typically with TABLE 1 includes an acrylic latex and silicate binder and/or an acrylic-urethane binder. In some embodiments, the resin binder is silicate acrylic latex. In such a formulation, the silicate binder may be sodium silicate and/or potassium silicate. The surfactant is suitably a non-ionic surfactant, often, when desired octyl phenol ethoxylate. The dispersant typically acts as a stabilizer and includes a solution of a sodium salt of an acrylate copolymer. The thickener is typically a urethane-based rheology modifier. The filler is typically a fine calcium carbonate having particles less than 10 microns in size. The defoamer is typically an acetylenic-modified polysiloxane-based defoamer or a parraffinic defoamer. Often, when desired, both types of defoamers are provided to the formulation. A pigments includes those typically used with primer formulations. A suitable pigment is titanium dioxide.

In additional embodiments, the resin is an acrylic-urethane binder. In such a formulation, the surfactant is suitably a solution of an alkylammonium salt of a polyfunctional polymer with anionic/non-ionic character. The dispersant typically acts as a stabilizer and includes a solution of a sodium salt of an acrylate copolymer. The cross-linker is typically a polyisocyanate cross-linker (with or without a blocker). The filler is typically talc having particles about 1 to 10 microns in size. The defoamer is typically a non-silicone defoamer. The solvent is generally ethylene glycol or ethylene glycol monobutyl ether. A pigment is a typical pigment suitable for primer formulations, such as titanium dioxide in a quantity and, with the addition of other ingredients, help prevent undue settling.

Additional features of multifunctional primers described herein are shown in TABLE 2.

An example of a formulation having an acrylic-silicate binder is provided in TABLE 3. Resin binder A is in the form of, for example, an acrylic binder. Resin binder B is in the form of, for example, a silicate binder. Such a formulation as shown in TABLE 3 provides an NVM of less than 44%, an NVV of less than 27%, PVC of about 40% and CPVC of about 57%, when prepared as a formulation of about 10-11 lb/gal.

TABLE 3

| Component | Amount (lb.) |
|---|---|
| water | >300 |
| surfactant | <2.0 |
| dispersant/stabilizer | >2.0 |
| resin binder A | 200-290 |
| resin binder B | 200-290 |
| cross-linker | 50-100 |
| filler | 120-180 |
| defoamer | >1.0 |
| Thickener | >2.0 |
| pigment | 100-200 |

An example of a formulation having an acrylic-urethane binder is provided in TABLE 4. Such a formulation as shown in TABLE 4 provides an NVM of less than 60%, an NVV of less than 45%, PVC of about 30% and CPVC of about 52%, when prepared as a formulation of about 11-12 lb/gal.

TABLE 4

| Component | Amount (lb.) |
|---|---|
| water | 25-60 |
| surfactant | <2.0 |
| dispersant/stabilizer | >5.0 |
| resin binder | 70-100 |
| cross-linker | 50-100 |
| filler | 25-60 |
| defoamer | >2.0 |
| pigment | 50-100 |

In a further example of a formulation comprising an acrylic-urethane binder, the formulation includes water as the carrier at about 50 lb/gal, a surfactant at about 1.0 lb/gal, a dispersant that is about 4.8 lb/gal, a solvent at 7.0 lb/gal, at least two titianium oxide pigments, one at about 30 lb/gal and the other at about 40 lb/gal, a filler at about 50 lb/gal, an acrylic binder that is at about 90 lb/gal and an isocyanate binder that is at about 75 lb/gal.

An example of pigment volume concentration as a function of wet adhesion is depicted in FIG. 1. With FIG. 1, wet adhesion was performed on outer saw cut edges of composite building material samples surfaced with a coating of a multifunctional primer formulation described herein and a top-

TABLE 2

| Solids lb/gal | | NVM (%) | | NVV (%) | | PVC (%) | | CPVC (%) | |
|---|---|---|---|---|---|---|---|---|---|
| Range | Pref. | Range | Pref. | Range | Pref. | Range | Pref. | Range | Pref. |
| <15 | <12 | 40-70 | 40-60 | 20-60 | 25-45 | 20-50 | 30-40 | 40-70 | <60 |

Pref. = an embodiment;
NVM = solids content by mass;
NVV = solids content by volume;
PVC = pigment volume concentration;
CPVC = critical pigment volume concentration.

coat, which was a water-based acrylic topcoat. The multifunctional primer included an acrylic-silicate binder, which was applied at a thickness of about 0.9 mil; the topcoat was applied at a thickness of about 1.6 mils. FIG. 1 illustrates that for such a formulation having a pigment volume concentration of between about 30% and 44% very good wet adhesion was achieved when applied to the composite building material which included a water-based acrylic topcoat.

For wet adhesion, samples included cementitious composite building specimens provided as sanded and sawcut boards having the following approximate dimensions: 3.5 inch×12 inch×1 inch. Applied to edges of each specimen (that has been sanded and sawcut), at room temperature and under initial moisture conditions of 0%-50%, was about 0.9 mil DFT of a multifunctional primer described herein in the absence of a sealer. The multifunctional primer was cured at an elevated temperature (e.g., by baking to reach a surface temperature of about 140 to 190 degrees Fahrenheit) and allowed to cool. This was followed by application of a about 1.5 mil DFT of an acylic latex topcoat that was cured at a similar elevated temperature and allowed to cool. Specimens were then soaked for about 24 hours in water. Paper towels were used to remove water from the surface of each specimen after soaking.

Wet adhesion were performed on composite building material specimens coated as described above using 3M™ Scotch® 250 tape (St. Paul, Minn.). Tape was 1 inch wide. Following application of the tape to the edge of the specimen, the tape was rolled with a 10 pound roller and then removed quickly. Wet adhesions on at least 10 specimens were performed for each of FIG. 1 and FIG. 2.

Figure 2:
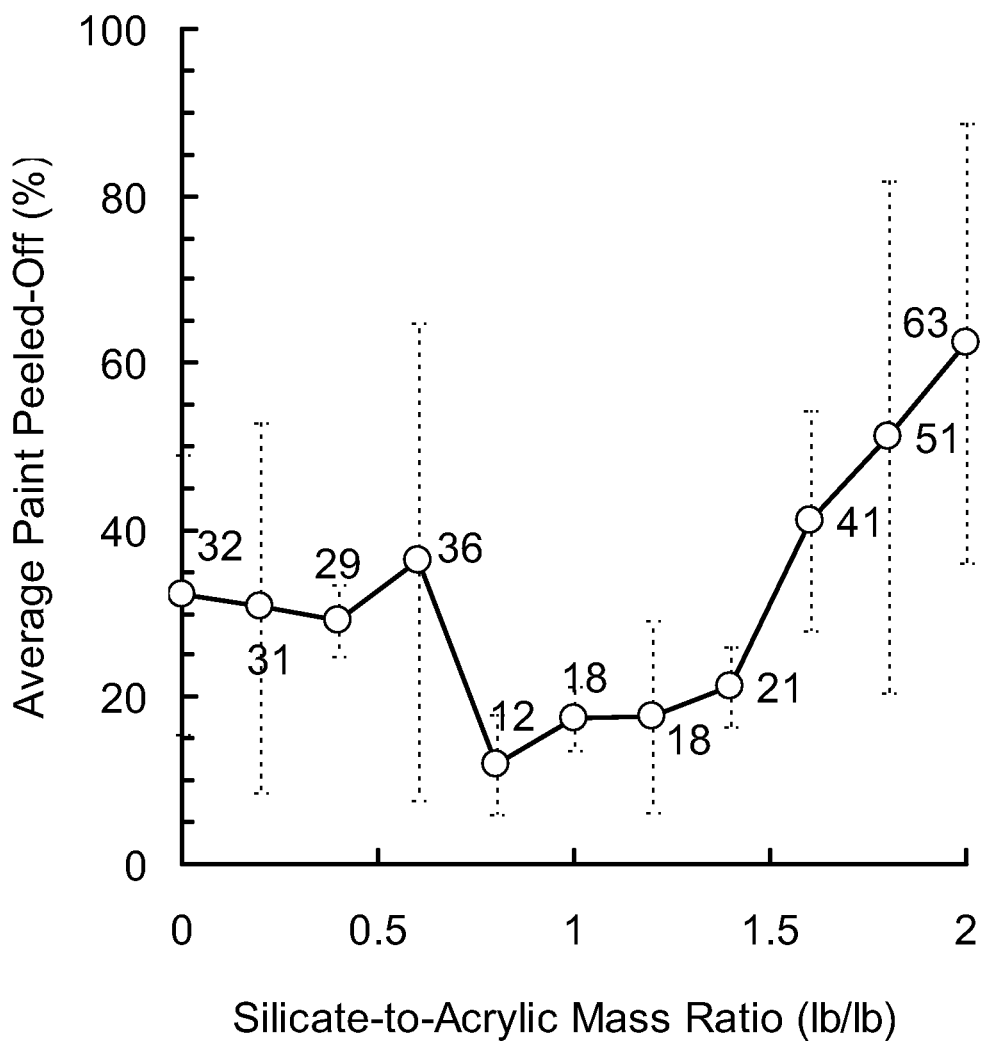
FIG. 2 illustrates wet adhesion as a function of the weight ratio between silicate binder and acrylic binder in a multifunctional primer formulation described herein.

For FIG. 1, the silicate binder-to-acrylic binder ratio was about 1:1 (lb/lb). An illustration of the silicate binder-to-acylic binder mass ratio is depicted in FIG. 2, in which specimens were prepared as described previously. For FIG. 2, wet adhesion was performed on saw cut edges of composite building material samples surfaced with a coating of a multifunctional primer formulation described herein and a topcoat of 100% acrylic latex. The multifunctional primer was applied at a thickness of about 0.9 mil and the topcoat was applied at a thickness of about 1.5 mils. FIG. 2 also shows that a suitable weight ratio is between about 0.75 and about 1.5 of a silicate binder to an acrylic binder.

Figure 3:
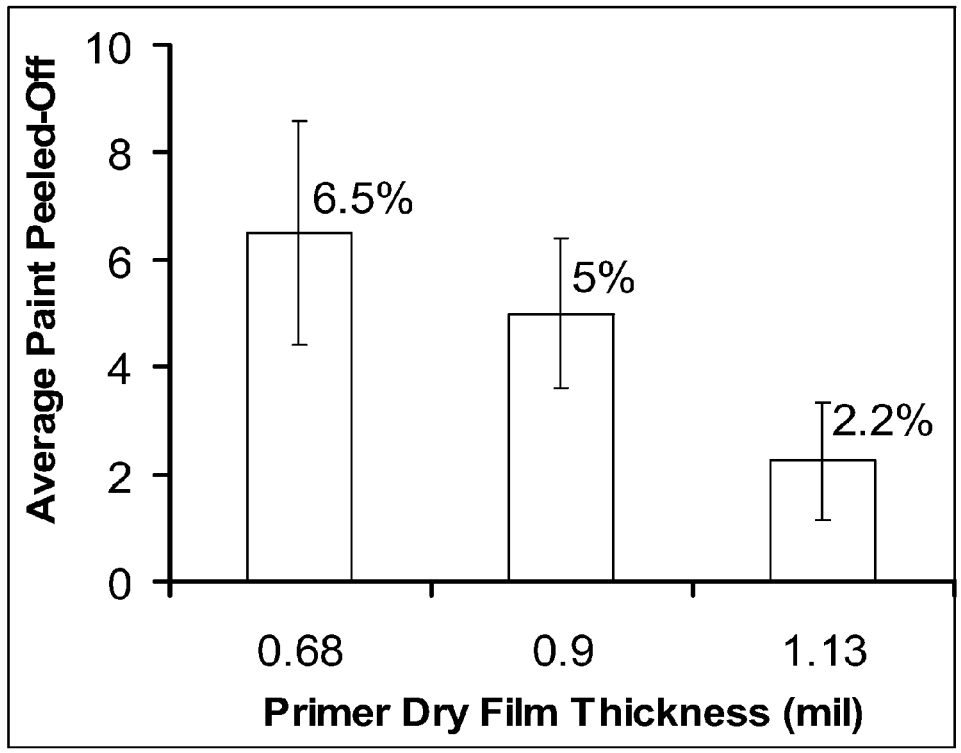
FIG. 3 depicts a representative bar graph showing dry adhesion of a multifunctional primer formulation described herein when applied at varying thicknesses on sanded faces of a composite building material.

FIG. 3 illustrates the degree of dry adhesion, as a percentage of the multifunctional primer that is removed by the tape, after application of an acrylic-urethane multifunctional primer on sanded faces of cementitious building composite samples. The figure shows that regardless of thickness of the multifunctional primer applied to the sanded faces, the multifunctional primer showed very good dry adhesion with generally less than 6.5% of the multifunctional primer removed by the tape. Thickness did not substantially change the degree of adhesion. When desired, a thicker multifunctional primer may be used to reduce removal to less than 2.5%. Thickness of the primer described herein will also help manipulate the overall appearance of the primer on the coated article.

Figure 4:
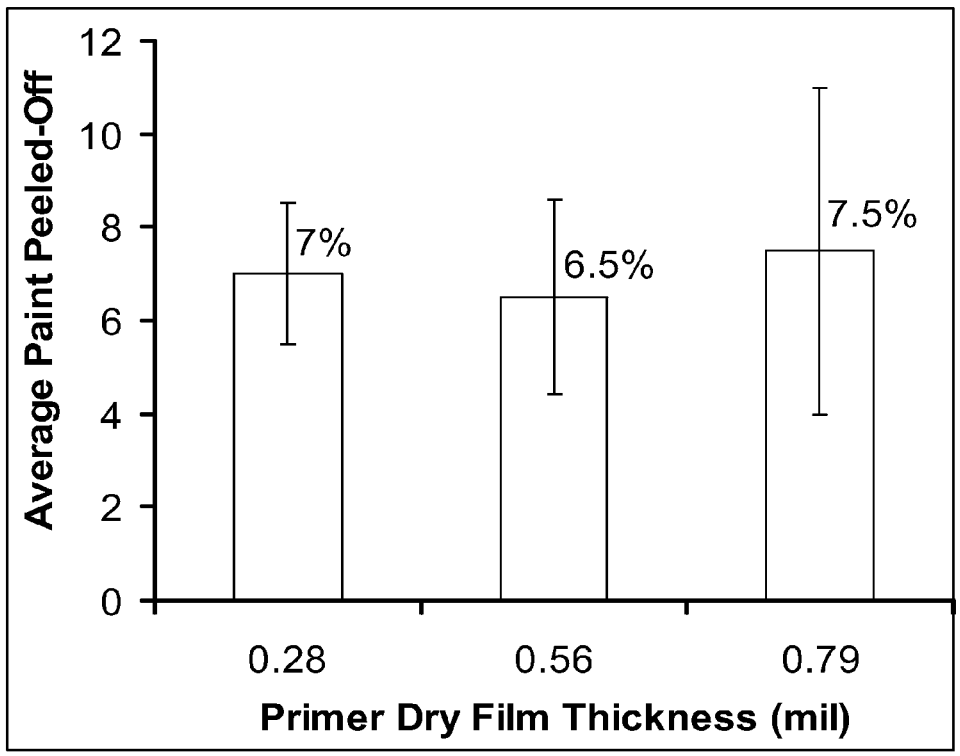
FIG. 4 depicts a representative bar graph showing dry adhesion of a multifunctional primer formulation described herein when applied at varying thicknesses on saw cut edges of a composite building material.

FIG. 4 illustrates the degree of dry adhesion, as a percentage of the multifunctional primer that is removed by the tape, after application of an acrylic-urethane multifunctional primer to saw cut edges (sides) of cementitious building composite samples. As with FIG. 2, regardless of the thickness of the multifunctional primer applied on the edges, the multifunctional primer showed very good dry adhesion with generally less than 7.5% of the multifunctional primer removed by the tape. The thickness did not substantially change the degree of adhesion. Again, thickness of the multifunctional primer appears to effect degree of adhesion; a thicker multifunctional primer may be used to reduce removal of the primer from saw cut sides of a composite building material. Thickness of the primer described herein will also help manipulate the overall appearance on the coated article.

Figure 5:
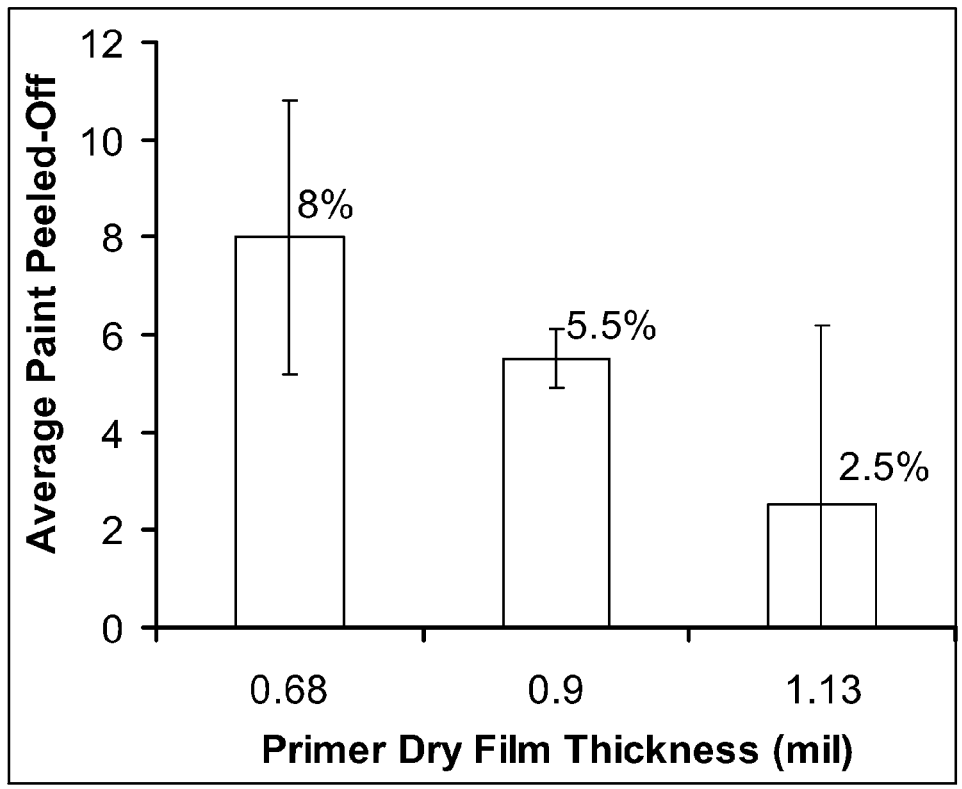
FIG. 5 depicts a representative bar graph showing wet adhesion of a multifunctional primer formulation described herein with a topcoat on sanded faces of a composite building material when the multifunctional primer is applied at different thicknesses.

FIG. 5 illustrates the degree of wet adhesion of an acrylic-urethane multifunctional primer, as a percentage of the coating that is removed by the tape, when measured for sanded faces of a cementitious building composite to which was applied a primer and an acrylic latex topcoat. As with FIGS. 1 and 2, FIG. 3 indicate that regardless of the thickness of the multifunctional primer applied, the coating adheres very well under wet conditions, with less than 8.0% removal by the tape. The thickness did not substantially change the degree of adhesion. When desired, a thicker multifunctional primer may be applied to reduce removal to less than 2.5%.

Figure 6:
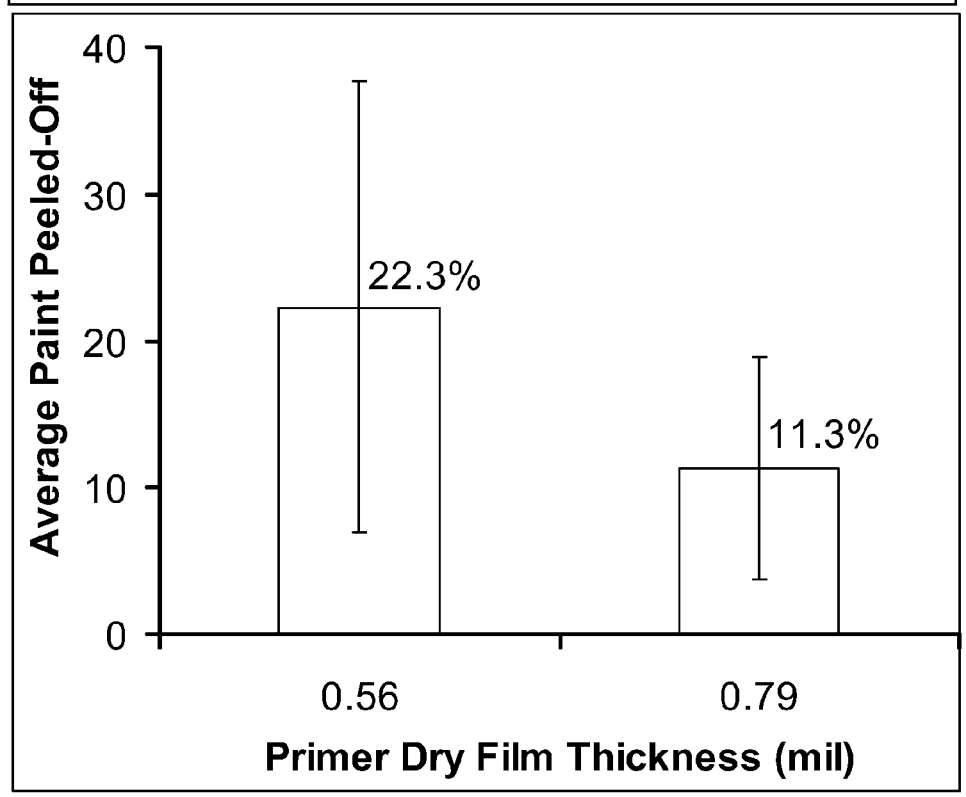
FIG. 6 depicts a representative bar graph showing wet adhesion of a multifunctional primer formulation described herein with a topcoat on sanded faces of a composite building material when the multifunctional primer is applied at different thicknesses.

FIG. 6 illustrates the degree of wet adhesion of an acrylic-urethane multifunctional primer, as a percentage of the coating that is removed by the tape, when measured for sawcut edges of a cementitious building composite to which a primer and an acrylic topcoat were applied thereon. The DFT of the multifunctional primer was found to positively affect adhesion when applied to the edges of a composite building material. A coating thickness of 0.75 mil or higher provided less than 11.3% removal of the coating (topcoat) under wet conditions.

Specimens used herein were provided to represent a composite building material that is typically a porous material comprising one or more different materials, such as a gypsum composite, cement composite, geopolymer composite or other composites having an inorganic binder. The surface of the material may be sanded, saw-cut, punched, water jet cut, sheared, machined, polished, extruded, molded or otherwise formed into any desired size and shape by various processes known in the art. The composite building materials may be fully cured, partially cured or in the uncured "green" state. Composite building materials may further include gypsum board, fiber cement board, fiber cement board reinforced by a mesh or continuous fibers, gypsum board reinforced by short fibers, a mesh or continuous fibers, inorganic bonded wood and fiber composite materials, geopolymer bonded wood and fiber boards, concrete roofing tile material, and fiber-plastic composite material. Desirable fibers include various forms of cellulose fibers, such as treated or untreated, bleached or unbleached Kraft pulp. In addition, other forms of fibers may be used. Suitable examples are those from ceramic, glass, mineral wool, steel, and synthetic polymers (e.g., polyamides, polyester, polypropylene, polymethylpentene, polyacrylonitrile, polyacrylamide, viscose, nylon, PVC, PVA, rayon, glass ceramic, carbon, any mixtures thereof).

Any additional additive may be optionally incorporated into a composite material including but not limited to density modifiers, dispersing agents, silica fume, geothermal silica, fire retardant, viscosity modifiers, thickeners, pigments, colorants, dispersants, foaming agents, flocculating agents, waterproofing agents, organic density modifiers, aluminum powder, kaolin, alumina trihydrate, mica, metakaolin, calcium carbonate, wollastonite, polymeric resin emulsions, hydrophobic agents, and mixtures thereof.

Embodiments of the multifunctional primer described herein provides improved physical and chemical properties to the building material substrate as compared with current primer formulations. The primer formulation described herein is multifunctional and may be applied as a sealer and primer in a single coating.

In desired implementations, a multifunctional primer formulation as described herein provides very good adhesion when applied to a composite building material. The pigment volume concentration for the formulation as well as a resinto-binder ratio may be manipulated to provide even more of an improvement in properties when desired.

In another embodiment, a multifunctional primer as described herein is applied to a dusty or polished surface of a fiber cement substrate. The multifunctional primer improves adhesion between the substrate and the primer. The multifunctional primer also improves adhesion of a topcoat, such as paint, varnish, stain.

A multifunctional primer formulation as described herein also provides a composite building material with improved adhesion to interior or exterior coatings. Importantly, the formulation as designed will offer superior durability and performance as compared with conventional products. By way of examples are those provided below, which are representative and non-limiting.

Example 1

In a 1000 mL stainless steel container, 350 g distilled water, 1.6 g Triton® X-100 surfactant (registered trademark of Rohm & Haas Company, Philadelphia, Pa.), 1.6 g BYK® 155 dispersant (registered trademark of Byk-Cera, Germany), 1.6 g Acrysol™ RM-8W thickener (trademark of Rohm & Haas Company, Philadelphia, Pa.), and 0.5 g Surfynol™ DF66 defoamer registered (trademark of Air Products and Chemicals, Inc., Lehigh Valley, Pa.) were mixed at medium speed for 20 to 30 minutes until a homogeneous mixture was obtained. Subsequently, a powder mixture containing 80 g $TiO_2$, and 140 g calcium carbonate was added. The mixture was then grinded in a high speed disperser for 30 to 45 minutes until a Hegman fineness of 5-6 was achieved. The letdown procedure involved slowly adding 264 g UCAR™ 626 acrylic resin (trademark of Union Carbide Corporation, Houston, Tex.) while mixing a low speed for 10-15 minutes, followed by the addition of 264 g Kasil® 1 potassium silicate resin (registered trademark of PQ Corporation, Valley Forge, Pa.) and mixing at low speed for another 10-15 minutes. Once completed, 0.1 g Dee Fo® 3010A defoamer (registered trademark of Munzing Chemie GmbH, Germany) was added and mixed for 10-15 minutes. Finally, pH of the primer mixture was measured and adjusted to 8-9, and the self-sealing primer was then filtered through a 200 micron filter paper.

Once prepared, the multifunctional primer of Example 1 was applied, using a brush (e.g., foam brush; however, other methods of application known to one of ordinary skill may be used). One or a number of surfaces may be coated with a multifunctional primer. For example, a raw fiber cement substrate may have a top sanded face and four saw cut edges of raw. Some of all of the surfaces of the substrate may be coated. The amount of wet primer applied was controlled with an analytical balance to achieve the target dry film thicknesses on both face and edges. The typical size of fiber cement samples was 3.5 inch×12 inch×1 inch with the initial moisture content of 5 to 50% by weight and the initial board temperature of 50° to 180° F. The coated fiber cement samples (having wet primer on top face and edges) were then cured in a lab-size conveyor oven, with a temperature set point of 450° F. and an adjustable belt speed, to achieve a board surface temperature of 160° to 190° F. at the oven exit.

Primed samples were left to further cure at room conditions for at least 24 hours before additional analysis were performed.

When samples were further coated with a topcoat, primed boards, once exiting the oven, were allowed to cool down to about 90° to 140° F. before application of the topcoat. The topcoat was a water-based, exterior grade, 100% acrylic latex. The amount of topcoat (applied by brush) was controlled with an analytical balance to achieve 1.5-2.5 mils DFT on its face and edges. Subsequently, the topcoated samples were cured in the conveyor oven to achieve a board surface temperature of 160° to 190° F. at the oven exit. All coated samples were allowed to further cure at room conditions for at least 24 hours before additional analysis were performed.

Example 2

In a 500 ml stainless steel container, 50 g distilled water, 7 g ethylene glycol monobutyl ether solvent, 1.0 g BYK® 181 surfactant (registered trademark of Byk-Cera, Germany), 4.8 g BYK® 155 dispersant (registered trademark of Byk-Cera, Germany), and 1.0 g Surfynol™ DF75 defoamer (trademark of Air Products and Chemicals, Inc., Lehigh Valley, Pa.) were mixed at medium speed for 20 to 30 minutes until a homogeneous mixture was obtained. Subsequently, a powder mixture containing 30 g Hitox® $TiO_2$ (registered trademark of Tor Minerals, Corpus Christi, Tex.), 40 g Ti-Pure® R931 $TiO_2$ (registered trademark of E.I. DuPont de Nemours and Company, Wihnington, Del.) and 50 g Pioneer Talc 2620 was added. The mixture was then grinded in a high speed disperser for 30 to 45 minutes until a Hegman fineness of 5-6 was achieved. The letdown procedure involved slowly adding 90 g Carboset® CR717 acrylic resin (registered trademark of The Lubrizol Corporation, Wickliffe, Ohio) while mixing at low speed for 10 to 15 minutes, followed by the addition of 75 g Rhodocoat™ WT (trademark of Rhodia Inc., Cranbury, N.J.) 1000 and mixing at low speed for another 10 to 15 minutes. Once completed, pH of the primer mixture was measured and adjusted to 8 to 9, and the primer was finally filtered through a 200-micron filter paper.

Once prepared, the multifunctional primer of Example 2 was applied, using one-inch foam brushes. The primer was applied to the top sanded face and four saw cut edges of raw, uncoated fiber cement samples. The amount of wet primer applied was controlled with an analytical balance to achieve a target dry film thickness on the face and edges. The typical size of a fiber cement samples was 3.5 inch×12 inch×1 inch with the initial moisture content of 5 to 50% by weight and the initial board temperature of 50 to 180° F. The fiber cement samples with wet primer on top face and edges were then cured in a lab-size conveyor oven, with a temperature set point of 450° F. and an adjustable belt speed, to achieve a board surface temperature of 160 to 190° F. at the oven exit.

Primed samples were left to further cure at room conditions for at least 24 hours before any further analyses were performed.

Some samples were further coated with a topcoat. Here, primed boards, once exiting the oven, were allowed to cool down to 90° to 140° F. before application of the topcoat. The topcoat was a water-based, exterior grade, 100% acrylic latex. The amount of topcoat brushed on was controlled with the analytical balance to achieve 1.5 to 2.5 mils DFT on face and edges. Subsequently, the topcoated samples were cured in the conveyor oven to achieve a board surface temperature of 160° to 190° F. at the oven exit. All coated samples were further cured at room conditions for at least 24 hours before any further analysis was performed.

The examples and descriptions herein show multifunctional primer formulations described herein have improved adhesion to composite building materials. The multifunctional primer acts as a primer and sealer, in part from the binder provided in the formulation, which may comprise an acrylic latex and silicate binder, an acrylic siloxane binder, an acrylic-urethane binder or combinations thereof. Such formulations may be applied to a suitable composite substrate surface, even one that includes particulates or are dusty or polished.

The multifunctional primer formulation when provided offers improved adhesion of a topcoat applied to the multifunctional primer. Thus, formulations disclosed herein when applied to a suitable substrate, which is a generally porous composite material, provide excellent adhesion of a further coating, such as an interior or exterior paint, stain, and varnish, to the substrate, including those having manipulated, engineered, dusty and/or burnished surfaces. As such, the multifunctional primer described herein improves the service life of a paint and/or topcoat when applied to the multifunctional primer and is capable of maintaining durable contact between the composite substrate and any exterior coating (e.g., stain or paint) applied thereon.

An improved multifunctional primer formulation as described herein effectively blocks moisture from penetrating the composite building material. The multifunctional primer formulation when prepared and applied to a composite building material provides good wet and dry adhesion to the composite building material. Adhesion may be manipulated by varying the thickness of the applied multifunctional primer formulation. Moreover, the multifunctional primer formulation when applied to a composite building material provides good wet and dry adhesion of a topcoat (e.g., stain or paint) when further applied to the composite building material.

Although the foregoing description of the embodiments has shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the embodiments may manifest itself in other shapes and configurations as appropriate for the end use of the article made thereby.

The invention claimed is:

1. A multifunctional primer formulation for a composite building material wherein the formulation includes a pigment, a filler, and an emulsion, said emulsion comprising a binder comprising an acrylic latex and silicate binder, wherein the binder imparts multifunctional action to the primer and multifunctional action is maintained with addition of a separate topcoat, wherein the acrylic latex to silicate binder weight ratio is between about 0.5 and 1.5, and the filler comprises particles having an average particle size of between 1-10 microns, wherein the pigment volume concentration is between 30%-44%, wherein the formulation includes a dispersant as a solution of a sodium salt of an acrylate copolymer, wherein the pigment is in the form of titanium oxide which is not photocatalytic, and wherein the formulation has improved adhesion to a composite building material as compared with primer absent the binder.

2. The formulation of claim 1, wherein the formulation includes a surfactant as a nonionic surfactant.

3. The formulation of claim 1, wherein the formulation includes a polysilicone defoamer.

4. The formulation of claim 1, wherein the acrylic latex and silicate binder are in a weight ratio of about 1:1.

5. The formulation of claim 1, wherein the comprises fine calcium carbonate.

6. The formulation of claim 1, wherein the silicate binder is potassium silicate or sodium silicate.

7. The formulation of claim 1, wherein the multifunctional primer is a sealer.

8. A multifunctional primer formulation for a composite building material wherein the formulation includes a urethane acrylic latex binder, a pigment that is not photocatalytic, and a filler having a particle size between 1-10 microns, wherein the solids content by mass is between 40%-60% and the solids content by volume is between 25%-45%, wherein the binder imparts multifunctional action to the primer, wherein the formulation improves adhesion of a separate top coat and multifunctional action is maintained with addition of the separate topcoat.

9. The formulation of claim 8, wherein the formulation includes a dispersant as a solution of a sodium salt of an acrylate copolymer.

10. The formulation of claim 8, wherein the formulation includes a nonionic surfactant.

11. The formulation of claim 8, wherein the formulation includes a polysilicone defoamer.

12. The formulation of claim 8, wherein the urethane acrylic latex binder comprises an acrylic latex and urethane binder, said acrylic latex and urethane binder are in a weight ratio of about 1:1.

13. The formulation of claim 1, wherein the formulation is provided with crosslinking, thermal curing, dual-curing, UV curing and other curing technologies within a thermoplastic system.

* * * * *